United States Patent
Englund et al.

(10) Patent No.: US 6,604,514 B1
(45) Date of Patent: Aug. 12, 2003

(54) MEANS FOR A COMBUSTION ENGINE HAVING A SUPER CHARGER

(75) Inventors: Arnold Englund, deceased, late of Spänga (SE), Kirsten Englund, legal representative; Benny Lindbrandt, Saltsjö-boo (SE)

(73) Assignee: Lysholm Technologies AB, Stockholm (SE)

( * ) Notice: Subject to any disclaimer, the term of this patent is extended or adjusted under 35 U.S.C. 154(b) by 0 days.

(21) Appl. No.: 09/869,731

(22) PCT Filed: Dec. 8, 1999

(86) PCT No.: PCT/SE99/02292

§ 371 (c)(1),
(2), (4) Date: Nov. 26, 2001

(87) PCT Pub. No.: WO00/40844

PCT Pub. Date: Jul. 13, 2000

(30) Foreign Application Priority Data

Jan. 8, 1999 (SE) ................................................ 9900041

(51) Int. Cl.[7] .............................................. F02B 33/00
(52) U.S. Cl. ..................................... 123/559.1; 60/599
(58) Field of Search .......................... 60/599; 123/559.1

(56) References Cited

U.S. PATENT DOCUMENTS

| 1,371,444 A | | 3/1921 | Sherbondy | |
|---|---|---|---|---|
| 2,346,463 A | | 4/1944 | Szekely | |
| 3,797,562 A | * | 3/1974 | Brille et al. | 165/279 |
| 4,000,725 A | | 1/1977 | Harris | |
| 4,237,689 A | * | 12/1980 | Sampietro | 60/599 |
| 4,539,815 A | * | 9/1985 | Garcea | 60/599 |
| 4,563,983 A | * | 1/1986 | Hayashi et al. | 123/41.21 |
| 4,565,177 A | | 1/1986 | Roettgen et al. | |
| 4,660,532 A | | 4/1987 | Tholen | |
| 5,152,144 A | * | 10/1992 | Andrie | 60/599 |
| 5,316,079 A | * | 5/1994 | Hedeen | 165/140 |
| 5,974,802 A | * | 11/1999 | Blake | 60/605.2 |

FOREIGN PATENT DOCUMENTS

| DE | 2 059 220 | 6/1972 |
|---|---|---|
| DE | 32 00 689 A1 | 7/1983 |
| DE | 42 02 077 A1 | 7/1993 |

* cited by examiner

*Primary Examiner*—Hoang Nguyen
(74) *Attorney, Agent, or Firm*—Frishauf, Holtz, Goodman & Chick, P.C.

(57) ABSTRACT

The invention relates to an arrangement pertaining to internal combustion engines (1) that include a supercharger (6) and an intermediate cooler (13) mounted in a casing (4). The intermediate cooler includes tubular elements (14, 15) through which coolant flows for cooling the combustion air compressed by the supercharger (6). Conventional arrangements of this kind take up a significant amount of space, which is difficult to find in a typically crowded engine space, and also result in undesirable heating of the engine space. A significant improvement has been achieved in these respects by means of the present invention, which is characterized in that the tubular elements (14, 15) are housed in a cylindrical housing (16, 17) which includes longitudinally extending slots (20, 21) and which forms in the casing (4) a partition wall which is broken by said slots (20, 21) through which the compressed combustion air is intended to pass into and out from the spaces between the tubular elements (14, 15) and the housing.

16 Claims, 5 Drawing Sheets

MEANS FOR A COMBUSTION ENGINE HAVING A SUPER CHARGER

This application is a U.S. National Phase Application under 35 USC 371 of International Application PCT/SE99/02292 (published in English) filed Dec. 8, 1999.

The present invention relates to an arrangement pertaining to an internal combustion engine that includes a supercharger for compression of the combustion air delivered to the engine and a cooler for cooling the compressed combustion air by means of a heat exchanger through which a coolant flows, said arrangement being of the kind defined in the preamble of claim 1.

Compression of the combustion air, normally designated charge air, results in undesirable heating of the air. It is therefore usual to allow the charge air to pass through an intermediate cooler on its way to the engine. It is difficult to find space in the normally well-filled engine space to accommodate an intermediate cooler and, furthermore, the cooler must be secured in the engine space with the aid of robust fasteners, which also applies to the actual supercharger itself. Also required are hoses and fasteners that interconnect the supercharger and the inter intermediate cooler. Furthermore, it is necessary that sufficient room is available to enable connections and said parts to be inspected and serviced.

The object of the present invention is to provide a simple solution that is well adapted to overcome these problems.

This object is achieved in accordance with the invention with an arrangement that has the characteristic features set forth in claim 1. An extremely compact and effective intermediate cooler that can be secured easily to the engine has been provided by placing the cooling means, the intermediate cooler, in a casing which has outlet ports in immediate connection with the inlet ports of the engine and by designing the cooling means in the manner disclosed and locating said means opposite at least the major part of the outlet openings, such that the cooling means will be contacted by the charge air exiting through the outlet openings along the whole of its length.

In the embodiment defined in claim 2, the casing forming the distribution chamber is stably constructed with an openable cover that enables the heat exchanger to be withdrawn from the casing for inspection and cleaning purposes and then easily replaced in the casing. As disclosed in claim 5, in the case of this particular, which includes a housing integrated with the casing and accommodating said heat exchanger, it is possible to use the casing as a supercharger support means when necessary, such supportive use also applying in other respects. The casing is sufficiently strong for this purpose and also conducts the hot charge air from the supercharger outlet direct to the heat exchanger of the cooling means and from there to the cylinders without heating any intermediate hose connections.

One preferred embodiment of the arrangement has the characteristic features set forth in claim 3, whereby uniform cooling of the charge air to the various cylinders is achieved.

The invention will now be described in more detail with reference to various embodiments of inventive arrangements and also with reference to the accompany schematic drawings, in which FIG. 1 illustrates in perspective an internal combustion engine equipped with a supercharger and a cooling means, shown partly cut away;

Figure 1:
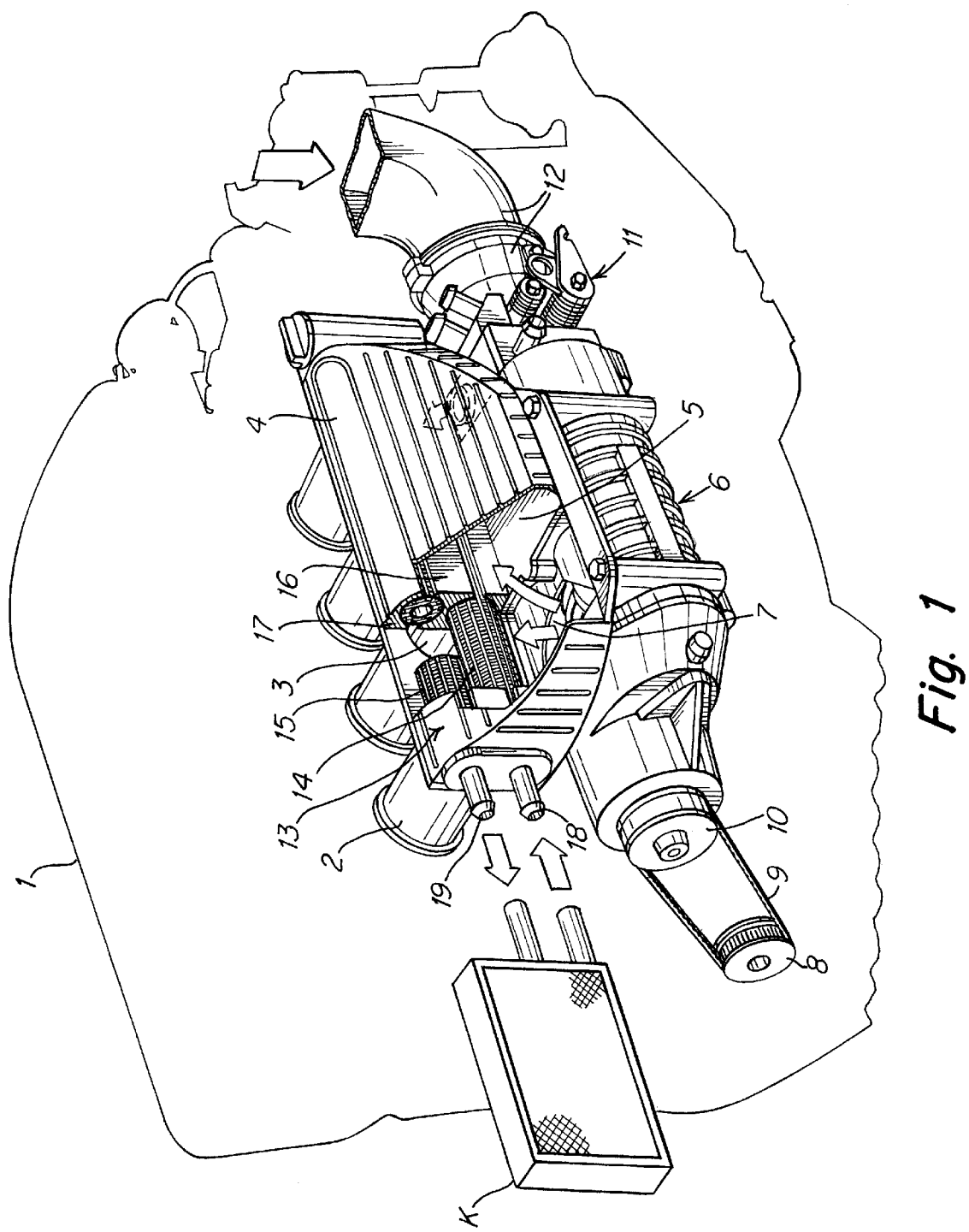

FIG. 1 illustrates the contours of a four-cylinder in-line internal combustion engine 1 having four inlet ports 2 connected to openings 3 in a casing 4 which forms a distribution chamber 5 for the compressed combustion air exiting from a supercharger 6. The supercharger communicates with the distribution chamber 5 through an opening 7 in the mutually opposing walls of the casing 4 and the supercharger 6. In the illustrated case, the supercharger 6 includes a helical rotor compressor which includes two rotors, of which one is adapted to be driven by a pulley 8 which is connected to the engine crank shaft and which drives a pulley 10 connected to said rotor via a toothed belt 9. The supercharger has connected to an air purifier (not shown) an inlet port 12 that includes a regulating valve means 11. Although not shown, the supercharger 6 is firmly screwed to one side of the engine and the casing 4 is screwed firmly to the upper side of the supercharger and also connected with the four inlet ports or induction ports 2.

The casing 4 houses a cooling means 13 which includes two mutually parallel and series-connected heat exchanger tubes 14, 15 which extend in front of the openings 3 to the inlet ports 2 as seen in the flow direction of the combustion air, and include external fine, transversal lamellae between the compressed combustion air flows whilst guided by housing 16, 17 surrounding said tubes and provided with axially extending slots 20, 21. Coolant flows axially through the tube 15 in one direction and through the tube 16 in the opposite direction via inlet and outlet stubs 18, 19 connected by hoses (not shown) to a separate cooler K which is cooled by the slipstream generated.

FIGS. 2–8 illustrate generally the same supercharger and cooling means, intermediate cooler, as those described above although the embodiment illustrated is adapted for the supply of cooled charge air to an internal combustion engine that has five cylinders. As will be seen from FIG. 2, the casing 4 and the supercharger 6 attached thereto are mounted as a single unit on the engine (not shown), by virtue of having pushed the openings 3 in the casing 4 over the inlet ports 2 of the engine, and thereafter tightening the supercharger 6 against the engine with the aid of fastener flanges 22 and screw fasteners 23, with the toothed belt 9 mounted on respective pulleys 8 and 10.

Figure 2:
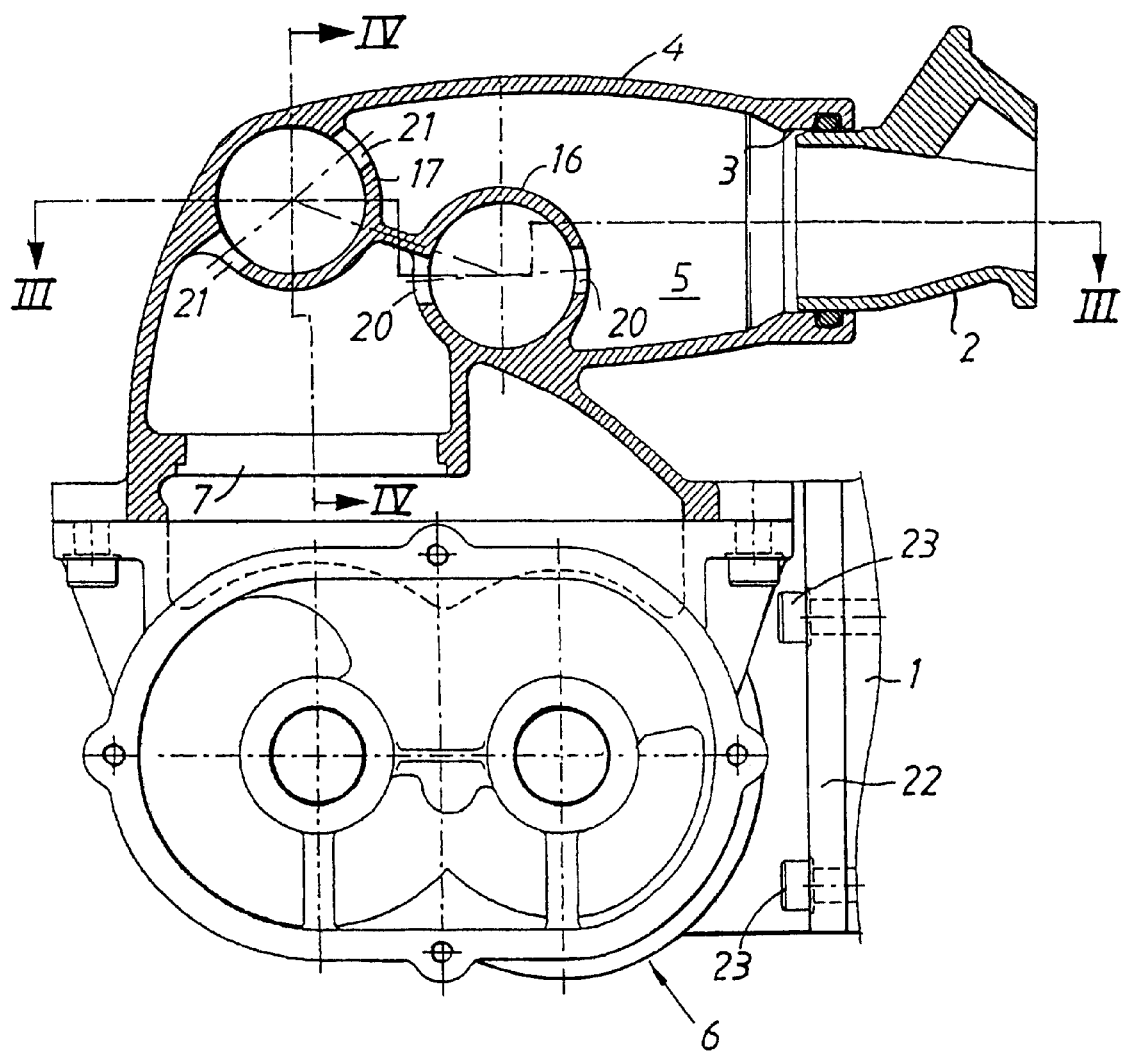
FIG. 2 is a side view of a supercharger and a cooling means casing shown in section.

As will be evident from FIG. 2, the charge air exiting from the supercharger 6 is pressed through the opening 7 into the induction ports 2 of the engine, via the distribution chamber 5. The charge air must therewith pass the cooling means 13 shown in FIG. 1 and represented in FIGS. 2 and 3 by the housing 16, 17 provided with said axial slots 20, 21, in which the heat exchanger tubes 14, 15 (shown in detail in FIGS. 6, 7 and 8) provided with said external cooling fins can be inserted. The housing 16, 17 can be closed on one side by means of two cover members 24, 25 provided with pipe stubs 18, 19, and on the other side by means of a cover member 26 which forms an overflow passageway for liquid coolant introduced through the pipe stub 18, and further through fine, axially extending passageways 27 in the wall of the tube 14 and then back through fine, axially extending passageways 28 in the wall of the tube 15 and from there out through the pipe stub 19. As before mentioned, the tubes 14, 15 are provided externally with fine peripheral cooling fins 29. As will be seen from FIG. 8, an O-ring is fitted at each end of the tubes 14, 15, between the outermost cooling fins 29 and respective cover members 24, 25, 26 so that the coolant will be led to the passageways 27, 28 and prevented from coming into contact with the cooling fins 29.

Figure 3:
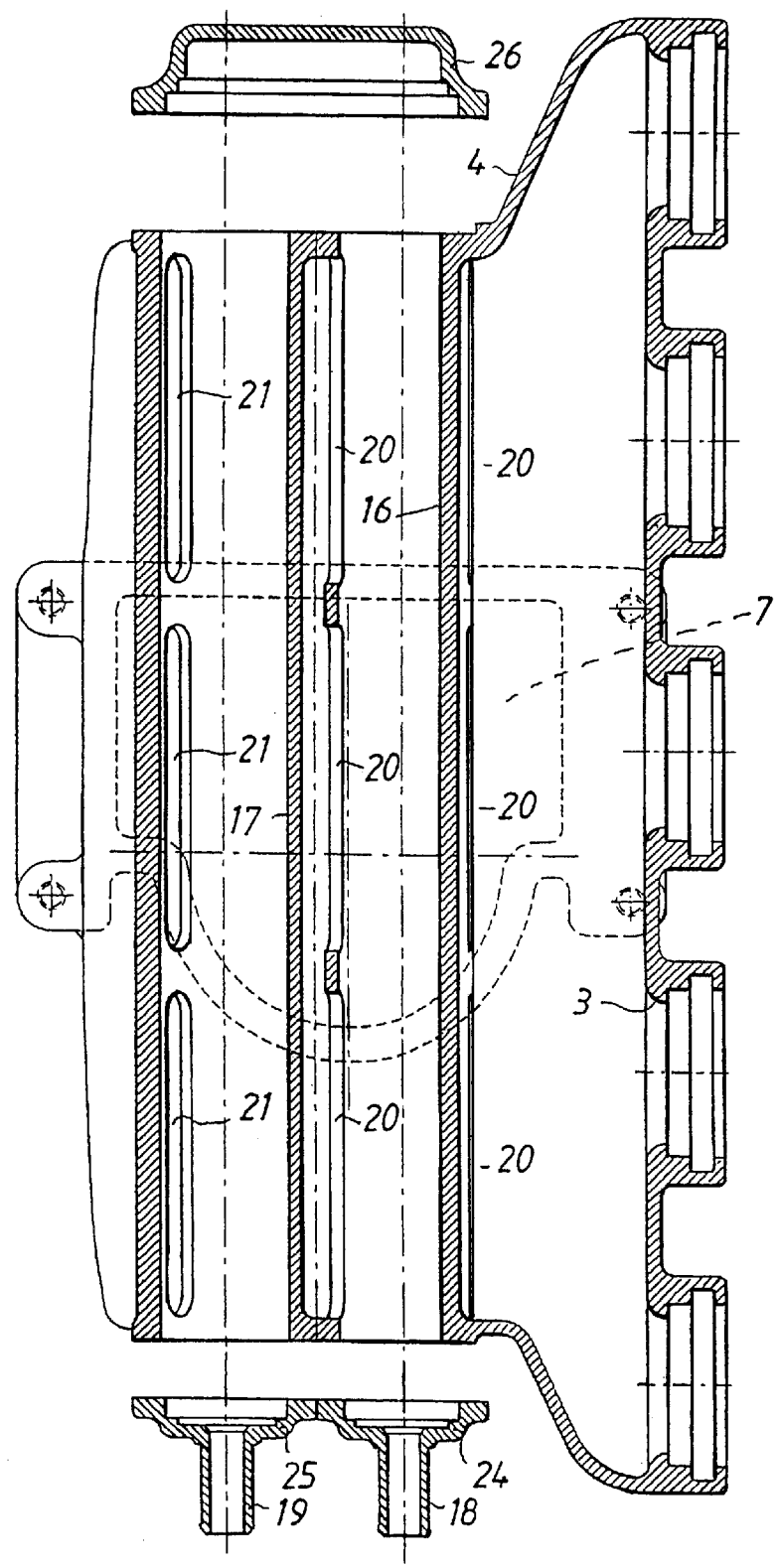
FIG. 3 is a sectional view taken on the line III—III in FIG. 2.
Figure 4:
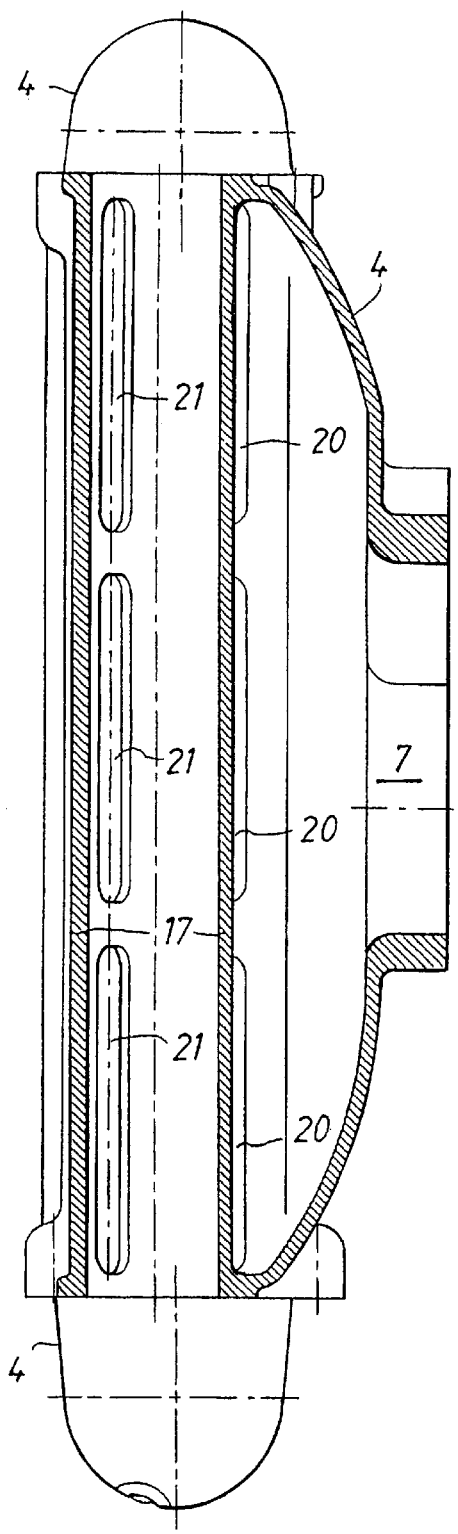
FIG. 4 is a sectional view taken on the line IV—IV in FIG. 2.
Figure 5:
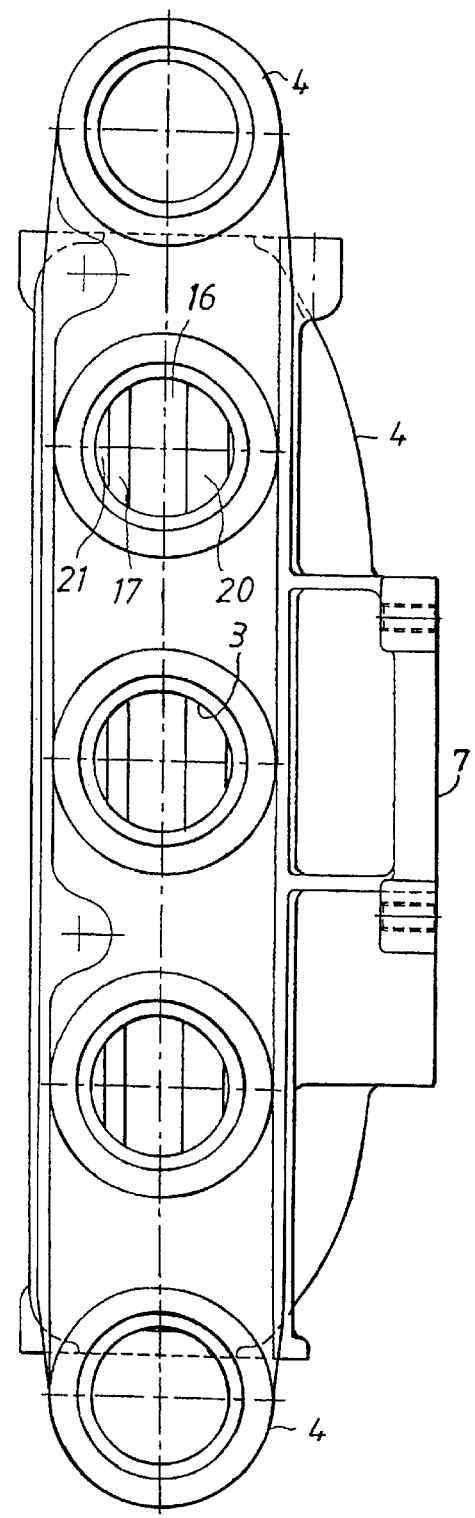
FIG. 5 is a view seen against the casing outlet openings in FIG. 3.
Figure 6:
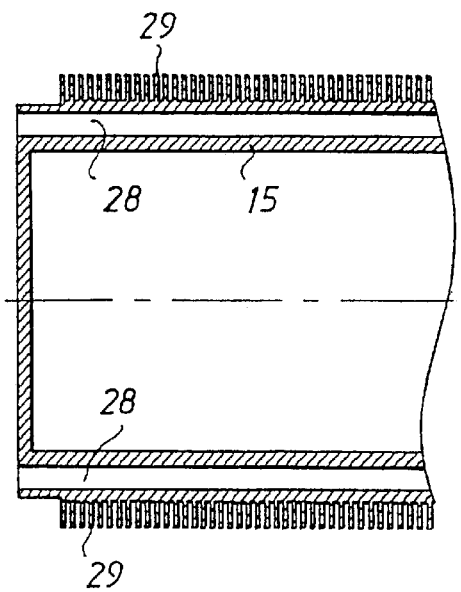
FIG. 6 is a longitudinal section view through one end of the heat exchanger shown in FIG. 1.
Figure 7:
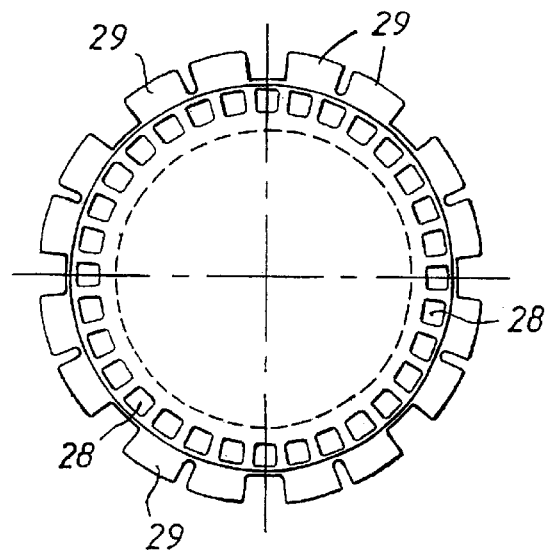
FIG. 7 is an end view of the heat exchanger shown in FIG. 6.
Figure 8:
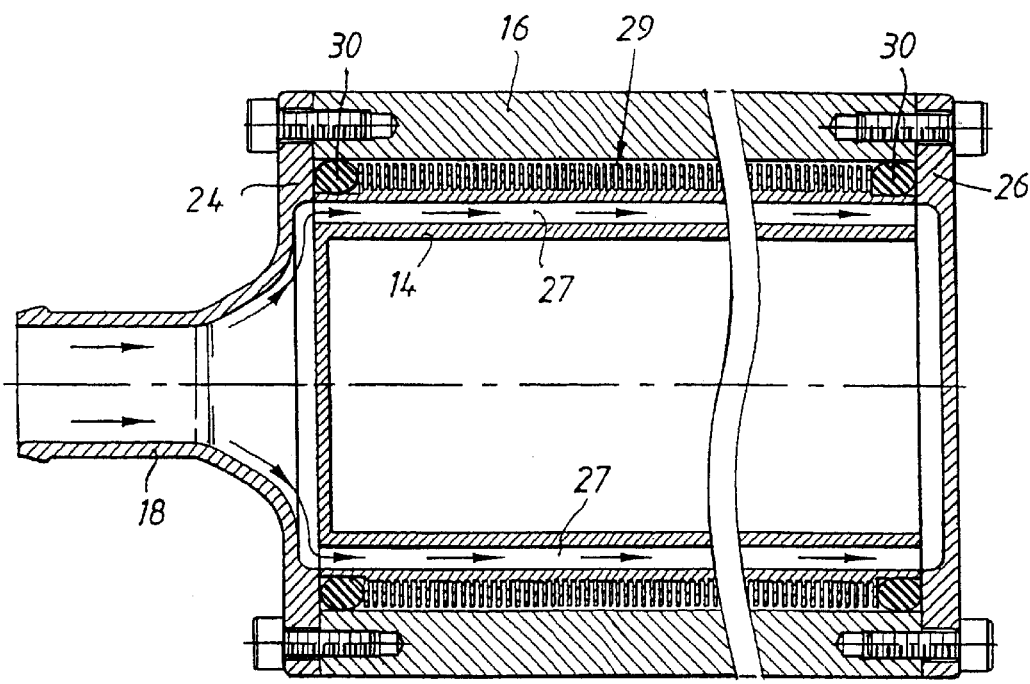
FIG. 8 is a longitudinal sectioned view through the heat exchanger of FIGS. 6 and 7 with surrounding housing, and shows cover members which close the ends of said housing.

The actual cooling means 13 is comprised of the heat exchanger tubes 14, 15 illustrated in FIGS. 1 and 6–8, wherewith the charge air flows between the lamellae 29 of said tubes in the cross-direction thereof, said tubes being cooled by the liquid coolant that flows in a closed circuit formed by the passageways 27, 28 and the cooler K and the hose connections (not shown) connected between the cooler and the pipe studs 18, 19. The charge air is guided in intimate contact with the lamellae 29 through the tube housings 16, 17 which through the medium of slots 20, 21 direct the flow of charge air directly to the major part of the outlet openings 3 and indirectly to the two outermost openings 3, as illustrated in FIGS. 3–5 when found necessary for space reasons. Air will nevertheless be distributed uniformly to all outlet openings 3. By using two series-connected heat exchanger tubes 14, 15, the temperature distribution of the cooled charge air is also uniform in respect of all outlet openings 3.

It will be understood that the inventive arrangement can also be used in combination with V-type internal combustion engines, in which case the supercharger with intermediate cooler can be placed between the rows of cylinders with the outlet openings 3 facing in opposite directions.

It will also be understood that the invention is not restricted to the illustrated and described embodiments thereof and that modifications can be made within the scope of the invention defined in the accompanying Claims. For instance, other types of elongate heat exchangers may be used. Furthermore, other types of superchargers are conceivable, for instance superchargers that are driven by engine exhaust gases, even though such solutions are less beneficial than the solutions illustrated in this document.

It is assumed that the coolant used is water, optionally with a glycol addition. In certain running conditions, e.g. in the case of high ambient temperatures, the intermediate cooling facility may be insufficient. It has been found that an increase in the temperature of the inlet air by only some degrees will have serious, unexpected drawbacks with respect to engine operation. Amplified cooling can be very significant in this respect, and consequently it may be expedient to use to this end a coolant used typically in a cooling plant, preferably a coolant used in an air-conditioning plant.

What is claimed is:

1. An arrangement pertaining to an internal combustion engine (1) that includes a supercharger (6) for compression of combustion air delivered to said engine, and a cooling means (13) for cooling the compressed combustion air by means of a heat exchanger that includes tubular elements (14, 15) through which a coolant flows and which are contacted externally by the compressed combustion air, wherein engine cylinder induction ports (2) are connected directly to outlet openings (3) allocated to respective induction ports, wherein said outlet openings (3) are formed in a casing (4) which communicates with the supercharger (6) and which forms a distribution chamber (5) for the compressed combustion air and in which the tubular elements (14, 15) in said heat exchanger are mounted in front of at least the major part of the outlet openings (3), wherewith the compressed combustion air flows transversely to the outlet openings (3), characterised in that the tubular elements (14, 15) of the heat exchanger are housed in a cylindrical housing (16, 17) that includes longitudinally extending slots (20, 21) and that forms integral with said casing a partition wall which is broken solely by the slots (20, 21) through which the compressed combustion air is intended to pass into the spaces between the tubular elements (14, 15) and the housing and out through said spaces in a direction towards the outlet openings (3) in said casing.

2. An arrangement according to claim 1, characterised in that the casing (4) is provided at least at one end of the cooling means (13) with an opening that extends through the wall of said casing (4), said opening being intended to permit said tubular elements (14, 15) to be inserted into the housing (16, 17), and wherein said opening can be closed with a cover member (24–26) that includes a coolant inlet (18) and a coolant outlet (19).

3. An arrangement according to claim 1, wherein the heat exchanger includes two mutually parallel and series-connected tubes (14, 15) through which liquid coolant flows.

4. An arrangement according to claim 1, wherein the tubular elements (14, 15) of said heat exchanger include external, transversal lamellae (29) that extend radially outwards to the surrounding housing (16, 17).

5. An arrangement according to claim 1, wherein the casing (4) forming said distribution chamber (5) has a wall that includes an inlet opening (7) for compressed combustion air, wherein the supercharger housing is positioned against said wall with a compressed combustion air outlet opening (7) that coincides with the casing inlet opening (7).

6. An arrangement according to claim 2, wherein the heat exchanger includes two mutually parallel and series-connected tubes (14, 15) through which liquid coolant flows.

7. An arrangement according to claim 6, wherein the tubular elements (14, 15) of said heat exchanger include external, transversal lamellae (29) that extend radially outwards to the surrounding housing (16, 17).

8. An arrangement according to claim 2, wherein the tubular elements (14, 15) of said heat exchanger include external, transversal lamellae (29) that extend radially outwards to the surrounding housing (16, 17).

9. An arrangement according to claim 3, wherein the tubular elements (14, 15) of said heat exchanger include external, transversal lamellae (29) that extend radially outwards to the surrounding housing (16, 17).

10. An arrangement according to claim 2, wherein the casing (4) forming said distribution chamber (5) has a wall that includes an inlet opening (7) for compressed combustion air, wherein the supercharger housing is positioned against said wall with a compressed combustion air outlet opening (7) that coincides with the casing inlet opening (7).

11. An arrangement according to claim 3, wherein the casing (4) forming said distribution chamber (5) has a wall that includes an inlet opening (7) for compressed combustion air, wherein the supercharger housing is positioned against said wall with a compressed combustion air outlet opening (7) that coincides with the casing inlet opening (7).

12. An arrangement according to claim 6, wherein the casing (4) forming said distribution chamber (5) has a wall that includes an inlet opening (7) for compressed combustion air, wherein the supercharger housing is positioned against said wall with a compressed combustion air outlet opening (7) that coincides with the casing inlet opening (7).

13. An arrangement according to claim 4, wherein the casing (4) forming said distribution chamber (5) has a wall that includes an inlet opening (7) for compressed combustion air, wherein the supercharger housing is positioned against said wall with a compressed combustion air outlet opening (7) that coincides with the casing inlet opening (7).

14. An arrangement according to claim 7, wherein the casing (4) forming said distribution chamber (5) has a wall that includes an inlet opening (7) for compressed combustion air, wherein the supercharger housing is positioned against said wall with a compressed combustion air outlet opening (7) that coincides with the casing inlet opening (7).

15. An arrangement according to claim 8, wherein the casing (4) forming said distribution chamber (5) has a wall that includes an inlet opening (7) for compressed combustion air, wherein the supercharger housing is positioned against said wall with a compressed combustion air outlet opening (7) that coincides with the casing inlet opening (7).

16. An arrangement according to claim 9, wherein the casing (4) forming said distribution chamber (5) has a wall that includes an inlet opening (7) for compressed combustion air, wherein the supercharger housing is positioned against said wall with a compressed combustion air outlet opening (7) that coincides with the casing inlet opening (7).

* * * * *